United States Patent
Dillman et al.

[11] Patent Number: 5,873,918
[45] Date of Patent: Feb. 23, 1999

[54] FILTER CARTRIDGE FOR THE REMOVAL OF COMBUSTIBLE SUBSTANCE FROM EXHAUST GASES WITH REGENERATION

[75] Inventors: Hans-Georg Dillman; Jürgen Furrer, both of Eggenstein-Leopoldshafen, Germany

[73] Assignee: Forschungszentrum Karlsruhe GmbH, Karlsruhe, Germany

[21] Appl. No.: 999,568

[22] Filed: Dec. 3, 1997

Related U.S. Application Data

[63] Continuation-in-part of PCT/EP96/02641 filed Jun. 19, 1996.

[30] Foreign Application Priority Data

Jul. 4, 1995 [DE] Germany ......................... 195 24 399.4

[51] Int. Cl.⁶ .................................................. B01D 41/00
[52] U.S. Cl. ..................... 55/282.3; 55/525; 55/DIG. 30; 60/311
[58] Field of Search .............................. 95/278; 55/283, 55/DIG. 30, 282.3, 523, 525; 60/311

[56] References Cited

U.S. PATENT DOCUMENTS

| | | | |
|---|---|---|---|
| 4,791,785 | 12/1988 | Hudson et al. | 55/DIG. 30 |
| 4,811,559 | 3/1989 | Henkel | 55/DIG. 30 |
| 4,829,766 | 5/1989 | Henkel | 55/DIG. 30 |
| 5,042,249 | 8/1991 | Ermannsdoerfer | 55/DIG. 30 |
| 5,165,899 | 11/1992 | Delauney et al. | 422/180 |
| 5,224,973 | 7/1993 | Hoppenstedt et al. | 55/DIG. 30 |
| 5,409,669 | 4/1995 | Smith et al. | 55/DIG. 30 |
| 5,436,216 | 7/1995 | Toyao et al. | 55/DIG. 30 |
| 5,458,664 | 10/1995 | Ishii et al. | 55/DIG. 30 |
| 5,557,923 | 9/1996 | Bolt et al. | 55/DIG. 30 |
| 5,571,298 | 11/1996 | Buck | 55/DIG. 30 |
| 5,656,048 | 8/1997 | Smith et al. | 55/DIG. 30 |

FOREIGN PATENT DOCUMENTS

| | | |
|---|---|---|
| 0 244 061 | 11/1987 | European Pat. Off. . |
| 0 454 346 | 10/1991 | European Pat. Off. . |
| 0 599 323 | 6/1994 | European Pat. Off. . |
| 0 608 783 | 8/1994 | European Pat. Off. . |
| WO 93/00503 | 1/1993 | WIPO . |

Primary Examiner—Duane S. Smith
Attorney, Agent, or Firm—Klaus J. Bach

[57] ABSTRACT

In a filter cartridge for insertion in a housing for the removal of combustible substances from exhaust gases, with a regeneration of the charged filter material by combustion of the substances, the filter consists of a metallic fiber mat welded together so as to form a hollow cylinder which is disposed tightly on an electrically conductive lattice structure. The ends of the hollow filter cylinder are compressed and tightly held, by metal sleeves, in engagement with a cartridge head and a cartridge foot structure and they are welded together by an end face weld seam. Current is supplied to the filter cylinder by way of the cartridge head and foot structure for heating the filter cylinder directly so that the combustible substances collected on the inside of the filter cylinder are efficiently burnt.

8 Claims, 3 Drawing Sheets

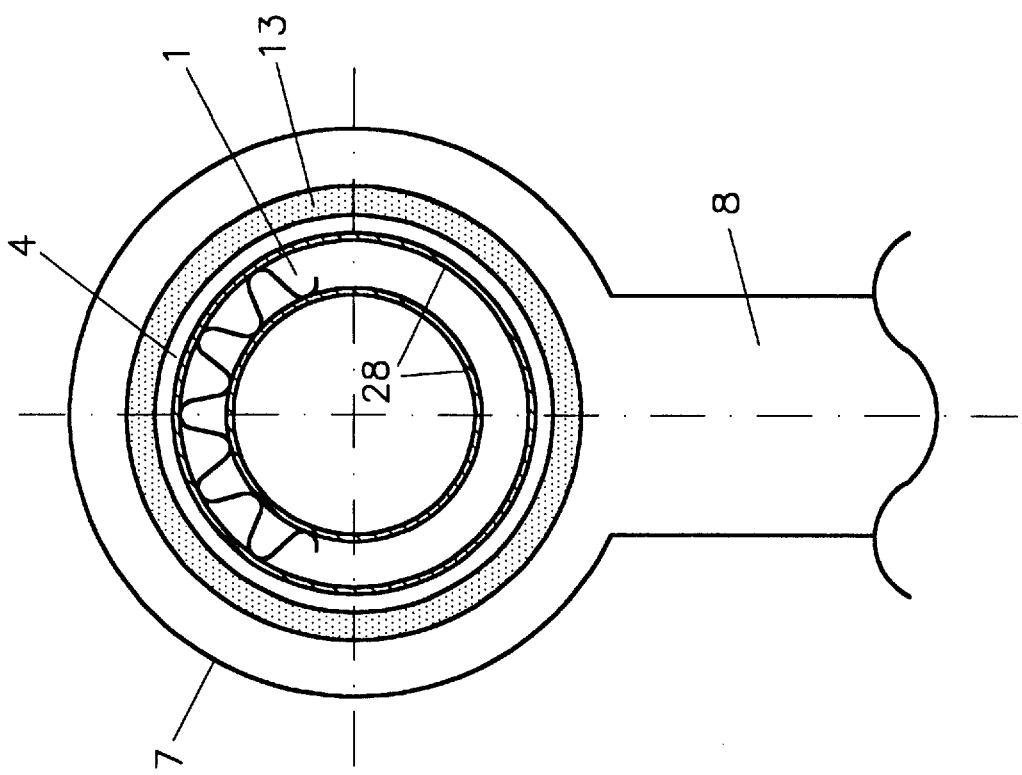
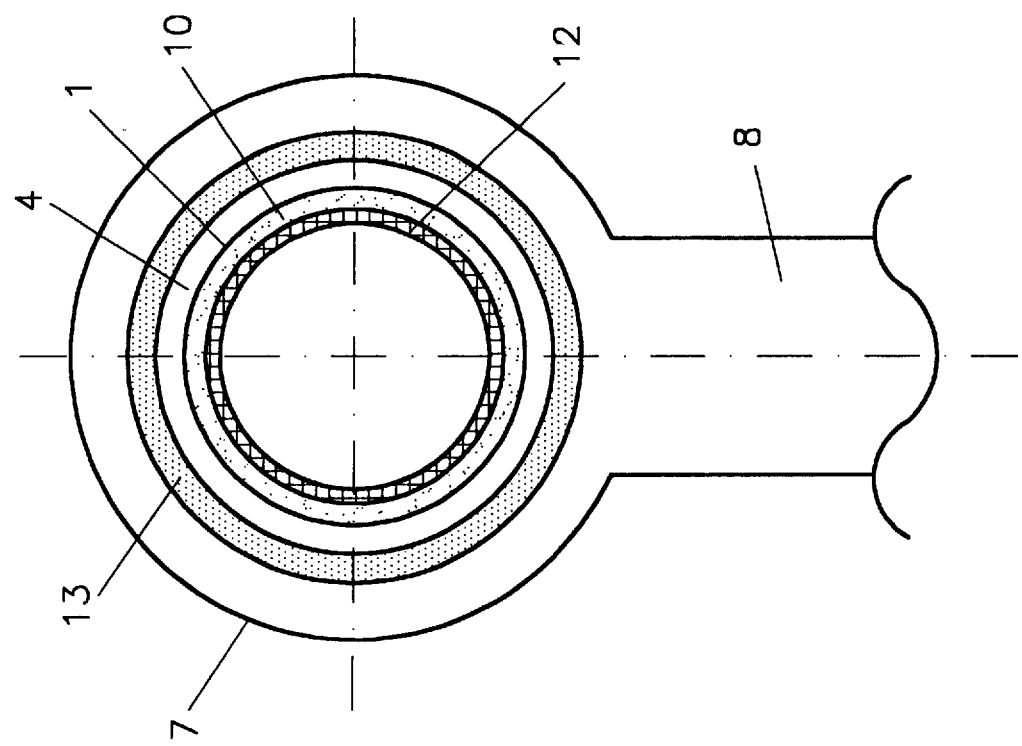

FILTER CARTRIDGE FOR THE REMOVAL OF COMBUSTIBLE SUBSTANCE FROM EXHAUST GASES WITH REGENERATION

This is a Continuation-in-Part application of international patent application PCT/EP96/02641 filed Jun. 19, 1996, and claiming the priority of German Application 195 24 399.4 of Jul. 4, 1995.

BACKGROUND OF THE INVENTION

The invention relates to a filter cartridge to be mounted in a housing for the removal of combustible substances from exhaust gases, wherein the charged filter materials are regenerated by combustion of the collected combustible substances. A filter disposed for example in the exhaust system of a Diesel engine which is charged with carbon and is itself electrically conductive is heated by an electric resistance heater to a temperature above the combustion temperature of the substances to be removed. The filter cartridge has a hollow cylindrical body of fiber material which body is closed at one end by an end plate and, at the other end, by an annular plate with an opening for the passage of gas. Electric energization is by way of the two end plates which are electrically conductive. At the end of the cartridge remote from the filter body of the filter cartridge, the current supply is arranged in the filter in the clean gas area and is electrically and thermally insulated from the housing.

The invention is concerned with the self-regeneration of soot filters in the exhaust gas system of Diesel engines. EP-OS 0 244 061 discloses a method of cleaning, that is, regenerating electrically conductive filter cartridges charged with combustible substances by combustion with the aid of electric ignition, wherein the electrically conductive filter material itself is directly resistance-heated above the combustion temperature of the substances to be removed. In this method, the filter cartridges are charged from the outside, which leads to heat losses during the combustion by radial heat radiation and consequently, to an unfavorable combustion process. The electric current is supplied, that is, the contacts for the initiation of the combustion process are disposed in this case on the outside of the filter cartridge in the area of the uncleaned exhaust gas. This results in an abnormally high corrosion of the contacts and, consequently, to a relatively short life of the filter.

Another filter cartridge is known from EP-A 0 454 346, wherein a ceramic filter element, which is to some degree electrically conductive is charged from the inside and is directly heated electrically. As a result of the low electric and thermal conductivity of the materials utilized the regeneration capability, however, is very limited. Consequently, only relatively small amounts of the substances deposited on the filter can be burnt.

Based on this state-of-the-art, it is the object of the present invention to provide a novel filter cartridge for the removal of combustible substances from exhaust gases with a regeneration of the charged filter cartridge by combustion with the aid of electric ignition, which is effective with optimal combustion particularly for the regeneration of soot filters in the exhaust system of Diesel engines. The cartridge should not have the disadvantages referred to above that is it should be reliable and require little energy for the electric ignition.

SUMMARY OF THE INVENTION

In a filter cartridge for insertion in a housing for the removal of combustible substances from exhaust gases, with a regeneration of the charged filter material by combustion of the substances, the filter consists of a metallic fiber mat welded together so as to form a hollow cylinder, which is disposed tightly on an electrically conductive lattice structure. The ends of the hollow filter cylinder are compressed and tightly held by metal sleeves, in engagement with a cartridge head and a cartridge foot structure and welded all together by an end face weld seam. Current is supplied to the filter cylinder by way of the cartridge head and foot structure for heating the filter cylinder directly so that the combustible substances collected on the inside of the filter cylinder are efficiently burnt.

Because of the metallic construction the current can be directly supplied to the filter material. As a result of the direct heating of the filter material and the particular design of the weld seams a rapid and low-loss heating of the filter material is possible. The arrangement of the electric contacts is such that they are not exposed to the gas to be cleaned, which is quite corrosive. Cleaning is possible during operation. Because of its modular design, the gas cleaning arrangement can be adapted to engines of various sizes. The ceramic envelope tube can reduce the heat losses and, at the same time, can be used as catalyst for other gas cleaning processes.

Other features of the filter cartridge and the associated method will be described below on the basis of FIGS. 1 to 4.

BRIEF DESCRIPTION OF THE DRAWINGS

FIG. 3 is a cross-sectional view of filter cartridge installed in a housing, and FIG. 4 shows another embodiment of the filter cartridge according to FIG. 3.

DESCRIPTION OF A PREFERRED EMBODIMENT

With the method used in the filter cartridge carbon particles are deposited on a metal fiber mat and are heated by direct electrical heating of the metal mat for complete combustion. The method has the purpose of regenerating the electrically conductive filter material, which is charged with combustible substances, by combustion or oxidation under excess oxygen with electrical ignition. Such filter materials are especially soot charged filters arranged in the exhaust systems of Diesel engines, wherein the electrically conductive filter material is heated, by direct electrical resistance heating, to above the oxidation-or, respectively, combustion temperature of the substances to be removed, whereby the regeneration process by oxidation of, for example, the soot is initiated.

Figure 1:
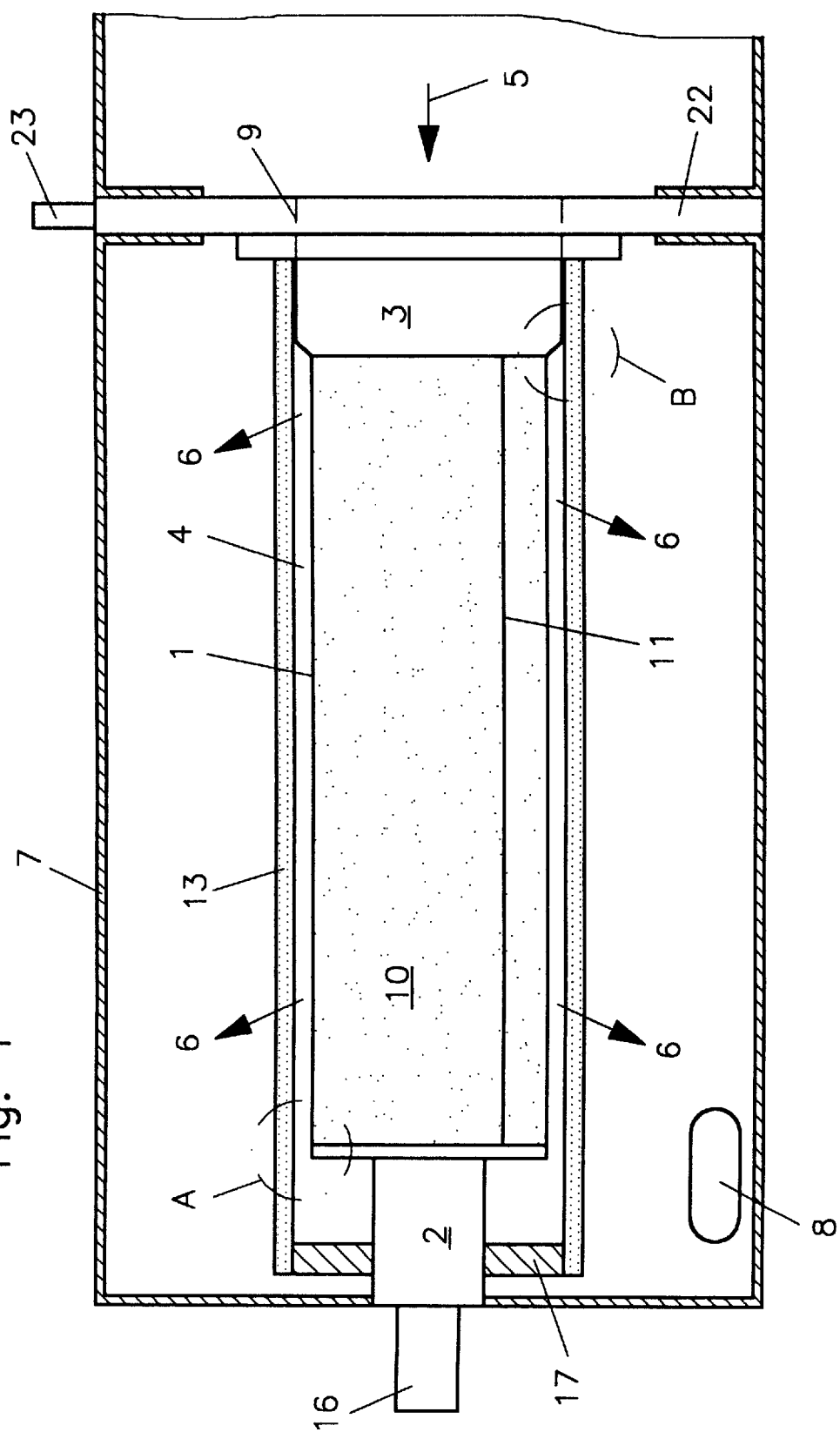
FIG. 1 is a side view of a filter cartridge.
Figure 2:
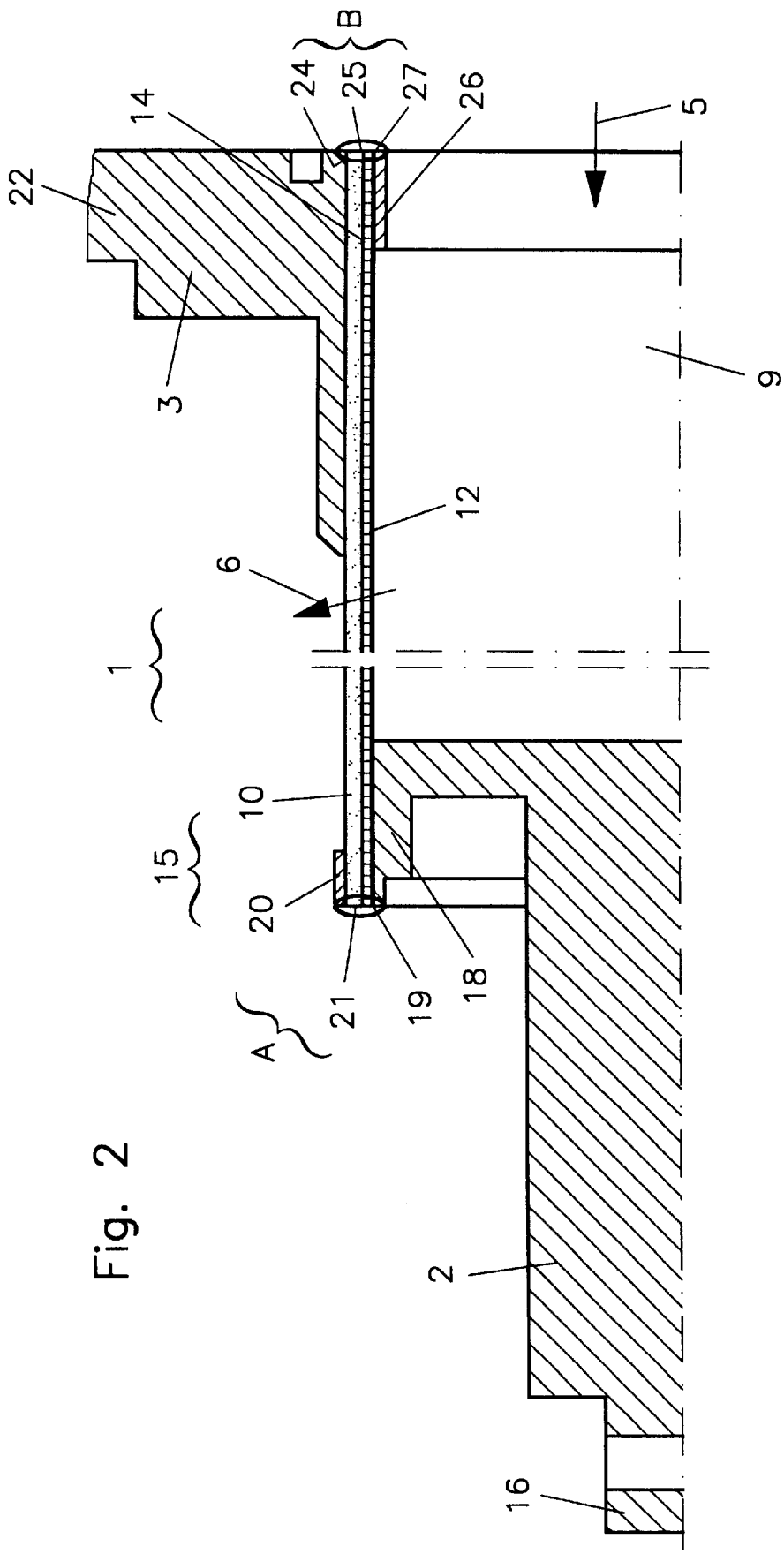
FIG. 2 is an enlarged longitudinal sectional view of the areas A and B and of FIG. 1.

In such a process, the electric current supply to the filter cartridge is particularly important in order to achieve a uniform and complete combustion. To this end, in accordance with the invention, the exhaust gas flows through the filter cartridge from the inside to the outside. The filter material includes a longitudinal welding or soldering seam and an inner tightly fitting electrically conductive support lattice structure of wire mesh. The electrical current required for the combustion is conducted at the inside of the hollow cylinder from a front end, for example the cartridge head 2 as shown in FIGS. 1 and 2, at the same time, into the filter material, the longitudinal seam and the support lattice structure. Since during cleaning the heat is first generated at the inner support lattice structure and the heat losses by radiation are smaller toward the interior than they are with a flow from the outside to the inside, the flow from the inside to the outside is particularly important. The current is supplied from the outside by contacting the cartridge head 2 at the outside, that is, from the clean gas end. This is important in order to protect the contact structures from corrosion, but it is only possible if the gas which is to be cleaned and is supplied to the inside of filter cartridge is admitted from the end opposite the filter cartridge head 2, that is, the filter cartridge foot end.

As filter material preferably metal fiber mats of an iron alloy with a content of 0.03% carbon, 15.8% chromium, 4.8% aluminum, 0.3% silicon and 0.3%, yttrium with a fiber diameter of 4 to 50 µm are used. As support lattice, a stainless steel wire mesh with a wire diameter of about 0.3 mm and a mesh width of about 0.1 mm is used. Such mats are resistant to temperatures of up to 1200° C.

FIG. 1 shows schematically a filter body 1 of a filter cartridge with a cartridge foot structure 3 and a cartridge head 2. Around the filter body 1 and at a distance therefrom, a ceramic gas permeable envelope pipe 13 is arranged which serves as a heat insulator and/or as a catalytic converter. An annular gap 4 remains between the filter body 1 and the pipe 13. The provision of such a pipe 13 (ceramic cover tube) is only possible with gas admission at the inside. The exhaust gas flows in the direction 5 toward the filter body 1 through the foot portion 3 of the cartridge, which foot portion is disposed on a connecting flange 22. The cleaned gas exits, by way of the annular gap 4, through the ceramic cover tube 13 in the direction 6. In order to achieve this flow direction the ceramic cover tube 13 is disposed with one side closely adjacent the cartridge foot structure 3 and, with its other end adjacent the cartridge head 2 that is, respectively, the insulation 17 so that the annular gap 4 is closed at its ends.

The filter cartridge for performing the regeneration process described herein is suitable for the insertion into a housing 7 with an exhaust gas canal 8. It comprises essentially a hollow cylindrical filter body 1 consisting of the conductive fiber material 10 whose one side is closed by the cartridge head 2, which forms an end plate and whose other side is disposed on an annular plate forming the cartridge foot structure 3, which includes openings 9 for the passage of gas. Electric current is supplied by way of the two electrically conductive parts 2 and 3. The filter body 1 consisting of the metal fiber mats 10 is welded or soldered together along a longitudinal seam to form a hollow cylinder, which is disposed tightly on an electrically conductive support lattice structure 12 of wire mesh (see FIG. 2). The one end 15 of the filter body 1 is welded or soldered to, on or into the endplate forming the cartridge head 2; the other end 14 is welded or soldered to, on or into the annular plate around the gas inlet opening 9, which forms the cartridge foot structure 3. The current supply 16 to this area is provided on the side of the cartridge head 2 remote from the filter body in the cleaned gas area. It is electrically and thermally insulated with respect to the housing 7 by an insulation structure 17. The ground connection is established by way of the current connecting member 23 disposed adjacent the connecting flange 22 of the cartridge foot structure 3.

Important are the weld connections between the filter body 1 and the cartridge foot structure 3 and also the cartridge head 2, which are shown in greater detail in FIG. 2. The left part shows the connection with the cartridge head (detail A); the right part shows the connection with the cartridge foot structure (detail B).

The weld seams at the connections form the electric current input and output locations to the fiber material 10. Furthermore, the cartridge head 2 has at its outer circumference a projection 18 with a front end 19 facing the cartridge head 2 over which the hollow cylinder extends up to the front end 19. Furthermore, a metal sleeve 20 extends tightly around the support lattice structure 12, the hollow cylinder formed from the fiber mat 10 and the projection 18. The front faces of the projection 18, 19, the hollow cylinder formed from the fiber mat 10, the support lattice structure 12 and the outer metal sleeve 20 are all disposed with their front ends together in a plane and are welded together by a front face seam 21.

At the other end of the filter cartridge, the hollow cylinder consisting of the fiber mat 10 is inserted, with the wire mesh into the gas inlet opening 9 of the filter cartridge and an annular weld lip 24 with a front surface area 25 is formed at the outside of the cartridge foot structure around the opening 9. A tightly fitting additional metal ring 26 is inserted at this location into the support lattice structure 12 and the aligned front ends of the weld lip 24, the hollow cylinder of the fiber mat 10, the support lattice structure 12 and the inner metal ring 26 are welded together by a front end weld seam 27. With this arrangement of the weld seams 21, 27 by which the thin fiber material 10 and the massive parts 2 and 3 are interconnected melting of the fibers by heat transfer during welding before the massive head and foot structure are sufficiently heated is prevented. In addition to the longitudinal welding seam 11 and the tightly fitting support lattice structure 12, the welding seams 21 and 27 are important for conducting the electric current into the fiber material.

For an especially rapid heating, the electric resistance of the longitudinal welding or soldering seam 11 in the longitudinal direction of the filter body 1 is smaller than the resistance over the total cross-section of the metal fiber mat. Preferably, the electrical resistance of the longitudinal seam 11 is about ¼ to ⅓ of the resistance of the metal fiber mat 10. Furthermore, the electrical resistance of the support lattice structure in longitudinal direction should be lower than the resistance of the metal fiber mat is in longitudinal direction over its full cross-section. Here too, the electrical resistance of the support lattice structure is preferably about ¼ to ⅓ of the resistance fiber mat. If the electrical resistance of the support lattice structure 12 and the longitudinal seam 11 in longitudinal direction of the filter body 1 are about the same both are heated at the same rate until they reach the ignition temperature, whereby the filter material 10 is uniformly heated from within at a rapid rate.

As shown in FIG. 3, the filter material 10 can be disposed directly on the support lattice structure 12 in a single or in several layers. But as shown in FIG. 4, it is also possible to arrange the filter material in a pleated fashion between two support lattice structures 28. The welding is done in this arrangement in the same way it is done in connection with the embodiment of FIG. 3.

What is claimed is:

1. A filter cartridge for insertion into a filter housing for the removal of combustible substances from exhaust gases, said filter cartridge comprising a hollow cylindrical filter body having an electrically conductive cylindrical support lattice structure, an electrically conductive fiber filter mat tightly disposed on, and supported by, said support lattice structure, said fiber filter mat consisting of a metal wire mesh welded or soldered along a longitudinal seam, an electrically conductive end plate forming a cartridge head disposed at one end of said filter body, an electrically conductive cartridge foot structure with an annular end plate defining a gas inlet opening disposed at the other end of said filter body, said cartridge head having at its outer circumference a projection with a front end which extends toward said cartridge head and over which said hollow cylindrical body extends, an outer metal sleeve disposed around said filter mat, said support lattice structure and said projection in a tightly fitted manner and all being welded together by a front face weld seam, said hollow cylindrical filter body extending into said gas inlet opneing of said cartridge foot structure such that a circumferential welding lip with an outwardly directed front face is provided at the outer circumference of said gas inlet opening, and an inner sleeve ring disposed in tight engagement with said support lattice structure, said welding lip, said hollow cylinder and said inner metal ring being all welded together by a face weld seam, said cartridge foot structure and said cartridge head, when connected to an electric power source, conducting electric current through said filter body thereby heating said fiber filter above the combustion temperature of combustible substances collected on said fiber filter.

2. A filter cartridge according to claim 1, comprising a ceramic gas-permeable envelope tube extending around said filter body in spaced relationship therefrom so as to form a gap providing for heat insulation and serving as a catalytic converter, said gap between the filter body and the tube being in communication with an exhaust gas outlet for the discharge of exhaust gases generated by the combustion of said combustible substances.

3. A filter cartridge according to claim 1, wherein said filter material consists of metal fiber mats comprising an iron alloy with 0.03% carbon, 15.8% chromium, 4.8% aluminum, 0.3% silicon and 0.3% yttrium and the fibers have a diameter of 4 to 50 μm.

4. A filter cartridge according to claim 1, wherein the electric resistance of the longitudinal welding or soldering seam in longitudinal direction of the filter body is lower than that of the metal fiber mat over its whole cross-section in longitudinal direction.

5. A filter cartridge according to claim 4, wherein said longitudinal seam has an electrical resistance which is about ¼ to ⅓ of the resistance of the mat.

6. A filter cartridge according to claim 1, wherein the electric resistance of the support lattice structure in the longitudinal direction of the filter body is lower than that of the metal fiber mat is over its full cross-section in longitudinal direction.

7. A filter cartridge according to claim 6, wherein the electric resistance of the support lattice structure is about ¼ to ⅓ of the resistance of the mat.

8. A filter cartridge according to claim 1, wherein said support lattice structure has an electric resistance which, in the longitudinal direction, is about the same as that of the longitudinal seam of said fiber filter mat.

\* \* \* \* \*